United States Patent Office 2,866,280
Patented Dec. 30, 1958

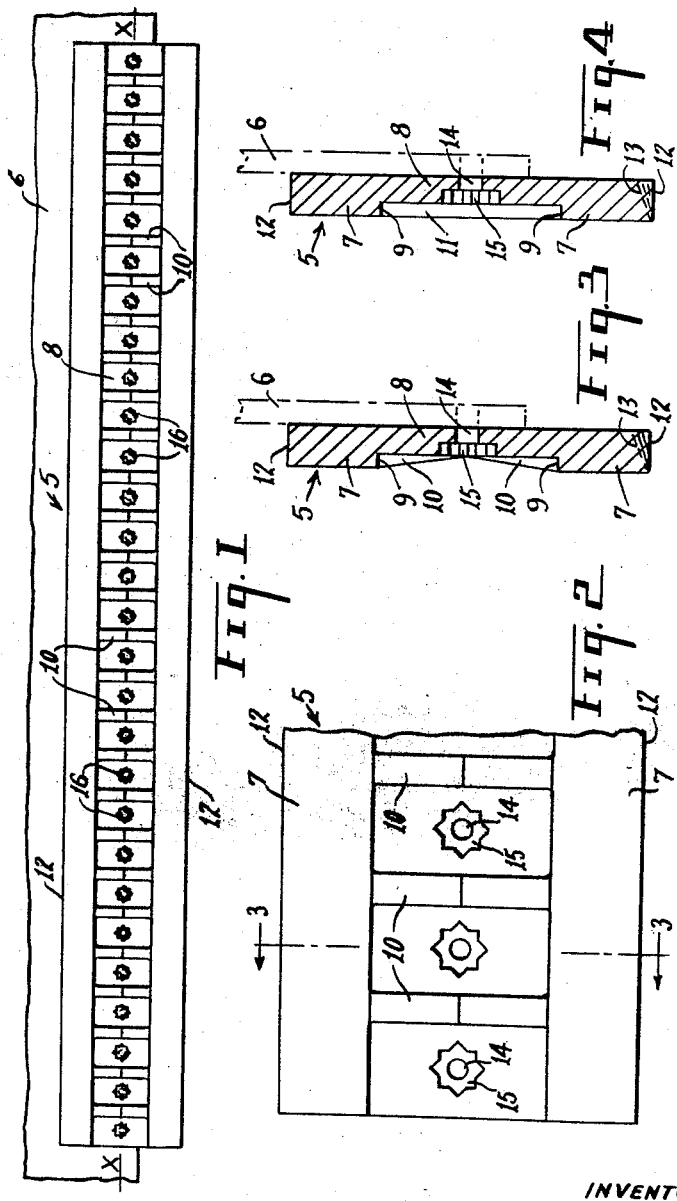

2,866,280
SCRAPER BLADE FOR DOZER ATTACHMENTS

George Kevin O'Connor, Montreal, Quebec, Canada

Application January 22, 1957, Serial No. 635,362

6 Claims. (Cl. 37—143)

This invention relates to scraper or cutting blades secured to the lower edge of dozer attachments for earth working machines and more particularly to scraper or cutting blades having reversible cutting edges of reinforced work-hardening alloy.

The invention consists essentially in the provision of a scraper blade for dozer attachments, the blade being cast of a work-hardening manganese or like alloy and having reversible cutting edges of reinforced metal, the reinforced cutting edges being tied together by a series of closely spaced ribs defining with the cutting edges a series of recessed pockets on the working face of the blade within which the heads of the bolts securing the blade to the dozer attachment are protected from damage.

It has been the practice to make the scraper blade attached to dozers from steel of rhomboid section, the acute angles of which formed the cutting edges requiring the blades to be reversed in two directions when changing from one cutting edge to the other. These cutting edges were susceptible to splitting and back curling after a short period of use and required considerable dressing up in order for the blade to lie flat against the dozer when the blade was reversed. Furthermore, because of the thin section of the blade in the area of the cutting edge any splitting and back curling tended to reach the area of the bolt holes in the blade causing large portions of the blade to be broken off, very often after only one cutting edge of the blade has been in use.

The object of the present invention is to provide a scraper blade for dozers having a pair of cutting edges of uniform thickness for a portion of the depth of the blade, the cutting edges being reinforced by ribs joining the cutting edges across the body of the blade.

A further object of the invention is to provide a scraper blade in which thickened cutting edges and joining ribs define depressed pockets along the horizontal centre line of the scraper blade, the pockets protecting the heads of the blade fastening bolts.

A further object of the invention is to provide a scraper blade cast of work-hardening manganese or like alloy having square cutting and self-sharpening edges.

These and other objects will be apparent from the following specification and the accompanying drawings, in which:

Fig. 1 is a front elevation of a scraper blade attached to the bottom edge of a dozer attachment, the dozer attachment being broken off above the scraper blade.

Fig. 2 is an enlarged view of an end portion of the scraper blade shown in Fig. 1.

Fig. 3 is a vertical section on the line 3—3 of Fig. 2 and showing in dotted outline the bottom end of the dozer attachment.

Fig. 4 is a vertical section similar to Fig. 3 but showing the rib joining the top and bottom portions of the blade as being of uniform thickness.

Referring to the drawings, the scraper blade 5 is cast in suitable length and is attached to the lower edge of a dozer attachment 6, for any type of earth moving machine. The dozer attachment 6 is shown in part only in Figs. 1, 3 and 4. One or more blades 5 can be used depending upon the length of the dozer attachment. The blades 5 are cast of work-hardening manganese or like alloy and have top and bottom horizontal portions 7 located in spaced relation to each other and connected together by a web 8 for the full length of the blade 5. The web 8 is of thinner section than the thickness of the outer horizontal portions 7 of the blade and is located in a vertical plane flush with the rear vertical surface of the top and bottom horizontal portions 7, leaving a portion 9 of the inwardly facing surfaces of the top and bottom horizontal portions 7 extending beyond the front vertical plane of the web 8. The ribbed side constitutes the working face of the scraper blade 5.

A large number of closely spaced vertical ribs 10 join the extending portion 9 of the horizontal portions 7 and the adjacent face of the web 8. In Figs. 1, 2 and 3 the vertical ribs 10 are shown tapering inwardly from the surface of the horizontal portions 7 to the horizontal centre line X—X of the blade 5, while in Fig. 4 the ribs 11 are shown having uniform thickness and being flush with the working face of the blade 5.

The top and bottom edges 12 of the blade 5 are the cutting edges and are at right angles to the work face of the blade and are self-sharpening along the dotted lines 13. The angle of self-sharpening on the lines 13 will be governed by the attitude of the blade 5 controlled by the angle at which the dozer attachment 6 is set on the earth moving machine.

The blade 5 is symmetrical in design on either side of the horizontal centre line X—X and can be reversed on the dozer attachment 6 after the cutting edge 12 of one of the horizontal portions 7 of the blade 5 has been worn down to a point near where there is not enough metal left in the lower horizontal portion 7 to withstand the impact upon it without splitting and back curling or the possibility of parts of the bar being broken off.

The blade 5 is provided with a series of cored holes 14 set out along the horizontal centre line X—X and spaced apart midway between each of the vertical ribs 10 in the web 8. The surface of the web 8 between the ribs 10 and concentric with the cored holes 14 is further cored at 15 to take the head of the blade securing bolts 16 by which the blade is fastened to the dozer attachment 6.

The above described scraper blade for use on dozer attachments has reversible top and bottom cutting edges, the reversing of which can be accomplished without turning the blade back to front as is necessary with scraper blades presently available. The large body of work-hardening metal available adjacent the cutting edges ensures that the blades can be subjected to a long period of self-sharpening before the blade need be reversed and that during the wearing down period, the thickness of the blade will not be reduced. Maintenance of the thickness of the blade throughout its working life ensures that the initial resistance to splitting and back curling will be maintained.

The rugged ribbed working face of the blade ensures that the bolts securing the blade to the dozer attachment will be protected to a considerable extent from abrasion and that the material being displaced will be broken up and displaced quickly and efficiently with little burden on the dozer attachment.

In practice the outer ends of the blades 5 are protected by separate corner shoes or end bits which extend from the ends of the blades 5 to the outer vertical edges of the dozer attachment 6. These corner shoes or end bits are not shown or described in detail as they do not form a part of the present invention.

What I claim is:

1. In a scraper blade for dozer attachments, a cast blade having top and bottom horizontal portions, a web of less thickness than the said horizontal portions joining the horizontal portions throughout the length of the blade, and a series of vertical ribs on the surface of said web, the said ribs reinforcing the joint between said horizontal portions and said web.

2. In a scraper blade for dozer attachments, a cast blade having top and bottom horizontal portions of rectangular section, a web of less thickness than the short side of said horizontal portions joining said horizontal portions throughout the length of the blade, and a series of vertical ribs on the surface of said web, the said ribs reinforcing the joint between the said horizontal portions and said web.

3. In a scraper blade for dozer attachments, a cast blade having top and bottom horizontal portions of rectangular section, the said horizontal portions being located edgewise in the same vertical plane, a web of less thickness than the short side of said horizontal portions joining said horizontal portions throughout the length of the blade and located with one side of the web in a vertical plane flush with one side of said horizontal portions, and a series of vertical ribs on the opposite surface of said web, the said ribs reinforcing the joint between the said horizontal portions and said web.

4. In a scraper blade for dozer attachments as set forth in claim 3, in which the vertical ribs are tapered inwards towards the surface of the web at a point on the horizontal center line of the blade.

5. In a scraper blade for dozer attachments as set forth in claim 3, in which the vertical ribs are of even thickness throughout their length between the top and bottom horizontal portions of the blade.

6. In a scraper blade for dozer attachments, a cast blade having top and bottom horizontal portions of rectangular section, the said horizontal portions being located edgewise in the same vertical plane, a web of less thickness than the short side of said horizontal portions joining said horizontal portions throughout the length of the blade and located with one side of the web in a vertical plane flush with one side of said horizontal portions, and a series of vertical ribs on the opposite surface of said web, the said ribs reinforcing the joint between the said horizontal portions and said rib, the said web having bolt-receiving apertures located between each of said vertical ribs and on the horizontal center line of the blade.

References Cited in the file of this patent

UNITED STATES PATENTS

| | | |
|---|---|---|
| 1,765,218 | Erhart | June 17, 1930 |
| 1,922,917 | Russell et al. | Aug. 15, 1933 |
| 2,257,761 | Paulsen | Oct. 7, 1941 |
| 2,633,164 | Kissner et al. | Mar. 31, 1953 |